United States Patent
Jeon

(10) Patent No.: US 11,560,178 B2
(45) Date of Patent: Jan. 24, 2023

(54) APPARATUS AND METHOD FOR DISPLAYING REAR IMAGE OF VEHICLE

(71) Applicant: HYUNDAI MOBIS CO., LTD., Seoul (KR)

(72) Inventor: Byeong Hwan Jeon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 484 days.

(21) Appl. No.: 16/293,991

(22) Filed: Mar. 6, 2019

(65) Prior Publication Data

US 2020/0023903 A1 Jan. 23, 2020

(30) Foreign Application Priority Data

Jul. 20, 2018 (KR) .......................... 10-2018-0084567

(51) Int. Cl.
*B62D 15/02* (2006.01)
*B60R 1/00* (2022.01)
*G06F 3/01* (2006.01)

(52) U.S. Cl.
CPC .......... *B62D 15/0295* (2013.01); *B60R 1/002* (2013.01); *B62D 15/021* (2013.01);
(Continued)

(58) Field of Classification Search
CPC .............. B62D 15/0295; B62D 15/021; B62D 15/0275; B60R 1/002; B60R 2300/8066;
(Continued)

(56) References Cited

U.S. PATENT DOCUMENTS

2007/0206833 A1\* 9/2007 Otsuka ............... G06K 9/00805
382/103
2014/0176605 A1\* 6/2014 Gibson ................. G06T 19/006
345/633
2016/0325678 A1\* 11/2016 Autran .................... G06F 3/012

FOREIGN PATENT DOCUMENTS

JP 2007-235642 A 9/2007
JP 2010-130673 A 6/2010
(Continued)

OTHER PUBLICATIONS

Luo, Linbo; Changshuai, Wang; Jun, Chen; Sangwoo, An; Yeumcheul, Jueng; Jongwha, Chong, Improved LUT-Based Image Warping for Video Cameras, 2011, IEEE, pp. 453,458, and 460 (Year: 2011).\*
(Continued)

*Primary Examiner* — Aniss Chad
*Assistant Examiner* — Chase L Cooley
(74) *Attorney, Agent, or Firm* — NovoTechIP International PLLC

(57) ABSTRACT

Disclosed are an apparatus and method for displaying a rear image of a vehicle. The apparatus for displaying a rear image of a vehicle includes a rear camera configured to capture a rear image of the vehicle, a steering angle sensor configured to sense a steering angle of a steering wheel, a display unit, and an image processing unit configured to convert the rear image captured by the rear camera when the vehicle moves backward into an image in a direction where the vehicle is to move backward according to the steering angle of the steering wheel that is sensed by the steering angle sensor, and display the converted image in the direction where the vehicle is to move backward through the display unit.

16 Claims, 4 Drawing Sheets

(52) U.S. Cl.
CPC ........ *G06F 3/013* (2013.01); *B60R 2300/301* (2013.01); *B60R 2300/60* (2013.01); *B60R 2300/8066* (2013.01)

(58) Field of Classification Search
CPC .......... B60R 2300/301; B60R 2300/60; B60R 2300/602; B60R 1/00; B60R 2300/605; B60R 2300/8093; G06F 3/013; B60W 50/14; B60W 30/18036; B60W 40/02; B60W 40/08; B60W 30/08; B60W 2050/146; B60W 2420/42; B60W 2540/18; B60W 2554/00; B60W 2050/143; G06K 9/00845

See application file for complete search history.

(56) References Cited

FOREIGN PATENT DOCUMENTS

| | | | |
|---|---|---|---|
| JP | 2015-107675 A | | 6/2015 |
| JP | 2015107675 A | * | 6/2015 |
| KR | 10-0899892 B1 | | 5/2009 |
| KR | 10-2013-0049947 A | | 5/2013 |
| KR | 10-2016-0095528 A | | 8/2016 |
| KR | 20160095528 A | * | 8/2016 |

OTHER PUBLICATIONS

Office Action of corresponding Korean Patent Application No. 10-2018-0084567—5 pages (dated Jun. 18, 2019).

* cited by examiner

APPARATUS AND METHOD FOR DISPLAYING REAR IMAGE OF VEHICLE

CROSS-REFERENCES TO RELATED APPLICATIONS

The present application claims priority to Korean application number 10-2018-0084567, filed on Jul. 20, 2018, which is incorporated by reference in its entirety.

BACKGROUND OF THE INVENTION

The present invention relates to an apparatus and method for displaying a rear image of a vehicle, and more particularly, to an apparatus and method for displaying a rear image of a vehicle, which display an image in a direction where the vehicle is to move backward, when the vehicle moves backward.

As the rear camera technology is generalized, a rear camera is mounted as a default option in the vehicle. Recently, when gears are changed into reverse and an angle of a steering wheel is changed, an expected trajectory is displayed with a solid line on a screen.

When moving in a certain direction, a person has a user experience (UX) that instinctively turns his/her head to the direction or moves his/her line of sight However, when trying to reverse parking, a driver does not fully secure his/her field of view in an actual direction that is expected in a state where the camera is fixed only with a trajectory in the direction, and there is also a case where the driver does not perceive an obstacle outside a screen in the moving direction.

The related art of the present invention is disclosed in Korean Patent No. 10-0899892 published on May 21, 2009 and entitled "Camera device for vehicle and guideline display method".

SUMMARY OF THE INVENTION

Embodiments of the present invention are directed to an apparatus and method for displaying a rear image of a vehicle, which improve convenience of a driver by displaying an image in a direction where the vehicle is to move backward, when the vehicle moves backward.

Embodiment of the present invention are also directed to an apparatus and method for displaying a rear image of a vehicle, which prevent a collision with an obstacle when the vehicle moves backward by sensing the obstacle being in a direction where the vehicle is to move backward.

In one embodiment, an apparatus for displaying a rear image of a vehicle may include: a rear camera configured to capture a rear image of the vehicle; a steering angle sensor configured to sense a steering angle of a steering wheel; a display unit; and an image processing unit configured to convert the rear image captured by the rear camera when the vehicle moves backward into an image in a direction where the vehicle is to move backward according to the steering angle of the steering wheel that is sensed by the steering angle sensor, and display the converted image in the direction where the vehicle is to move backward through the display unit.

The image processing unit may set a lookup table according to the steering angle to warp an image of a preset display angle corresponding to the steering angle from the rear image captured by the rear camera.

The apparatus may further include an eyeball recognition sensor configured to sense an eyeball position of a driver, wherein the image processing unit sets the lookup table according to the eyeball position of the driver that is sensed by the eyeball recognition sensor, and corrects the image in the direction where the vehicle is to move backward.

The apparatus may further include a display adjustment unit in which the display angle is manually adjusted by a driver, wherein the image processing unit sets the lookup table according to the display angle adjusted by the display angle adjustment unit, and corrects the image in the direction where the vehicle is to move backward.

The apparatus may further include an obstacle detection unit configured to analyze the image in the direction where the vehicle is to move backward to detect an obstacle.

The apparatus may further include a collision prevention unit configured to detect a possibility of collision of the vehicle with the obstacle detected by the obstacle detection unit, and prevent collision with the obstacle according to the detected collision possibility.

The collision prevention unit may include: a collision possibility detection unit configured to detect the possibility of collision of the vehicle with the obstacle detected by the obstacle detection unit; a determination unit configured to determine whether the collision possibility detected by the collision possibility detection unit is a preset threshold value or greater; and an alarm unit configured to output an alarm according to a determination result of the determination unit.

The collision prevention unit may include: a collision possibility detection unit configured to detect the possibility of collision of the vehicle with the obstacle detected by the obstacle detection unit; a determination unit configured to determine whether the collision possibility detected by the collision possibility detection unit is a preset threshold value or greater; and a brake control unit configured to control a brake of the vehicle to stop the vehicle according to a determination result of the determination unit.

The display unit may synthesize an obstacle overlay of the obstacle detected by the obstacle detection unit with the image in the direction where the vehicle is to move backward, and displays a synthesized result.

The display unit may synthesize a vehicle trajectory overlay of the vehicle with the image in the direction where the vehicle is to move backward, and displays a synthesized result.

In another embodiment, a method for displaying a rear image of a vehicle may include: capturing, by a rear camera, a rear image of a vehicle when the vehicle moves backward, and sensing, by a steering angle sensor, a steering angle of a steering wheel; converting, by an image processing unit, the rear image captured by the rear camera into an image in a direction where the vehicle is to move backward according to the steering angle of the steering wheel that is sensed by the steering angle sensor; and displaying, by the image processing unit, the image in the direction where the vehicle is to move backward through the display unit.

In the converting, the image processing unit may set a lookup table according to the steering angle and warp an image of a preset display angle corresponding to the steering angle from the rear image captured by the rear camera.

In the converting, the image processing unit may set the lookup table according to an eyeball position of a driver that is sensed by an eyeball recognition sensor, and correct the image in the direction where the vehicle is to move backward.

In the converting, the image processing unit may set the lookup table according to a display angle adjusted by a display angle adjustment unit, and correct the image in the direction where the vehicle is to move backward.

The method may further include: analyzing, by an obstacle detection unit, the image in the direction where the vehicle is to move backward to detect an obstacle; and detecting, by a collision prevention unit, a possibility of collision of the vehicle with the obstacle detected by the obstacle detection unit, and preventing a collision with the obstacle according to the detected collision possibility.

In the preventing, the collision prevention unit may output an alarm depending on whether the possibility of collision of the vehicle with the obstacle detected by the obstacle detection unit is a preset threshold value or greater.

In the preventing, the collision prevention unit may control a brake of the vehicle to stop the vehicle depending on whether the possibility of collision of the vehicle with the obstacle detected by the obstacle detection unit is a preset threshold value or greater.

In the displaying, the display unit may synthesize an obstacle overlay of the obstacle detected by the obstacle detection unit with the image in the direction where the vehicle is to move backward, and displays a synthesized result.

In the displaying, the display unit may synthesize a vehicle trajectory overlay of the vehicle with the image in the direction where the vehicle is to move backward, and displays a synthesized result.

DESCRIPTION OF SPECIFIC EMBODIMENTS

Figure 1:
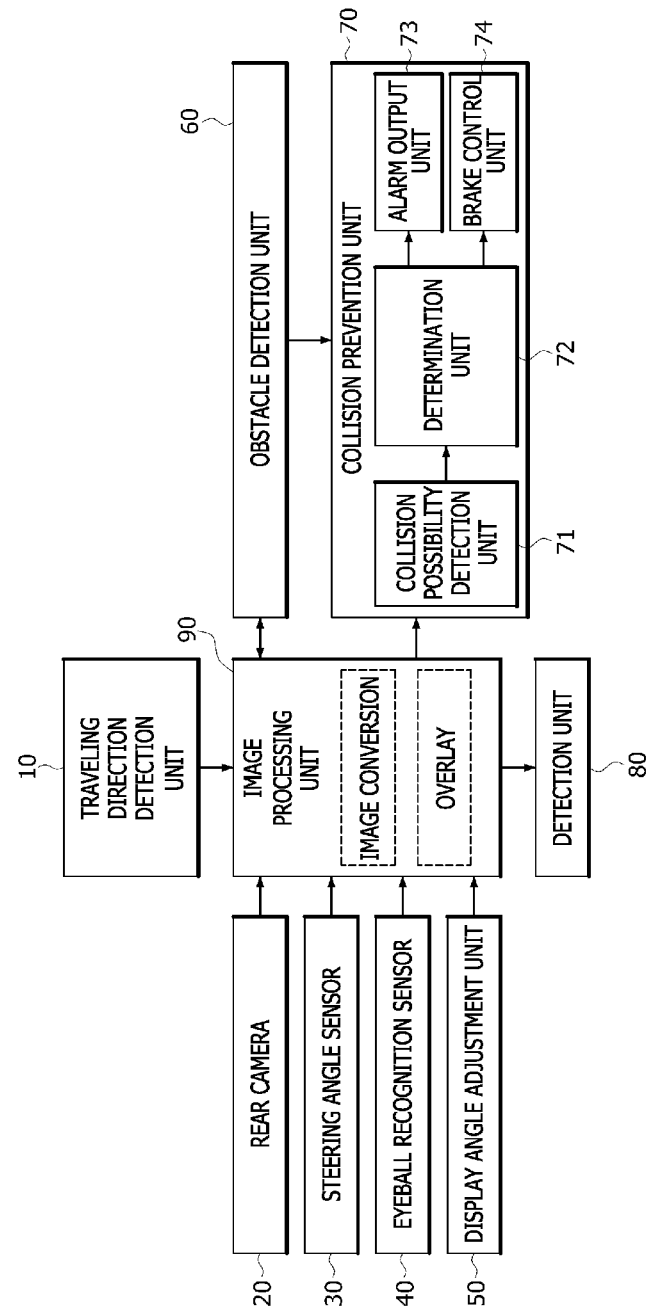
FIG. 1 is a block diagram of an apparatus of displaying a rear image of a vehicle according to an embodiment of the present invention.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like.

When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus and method for manufacturing a rear image of a vehicle according to the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
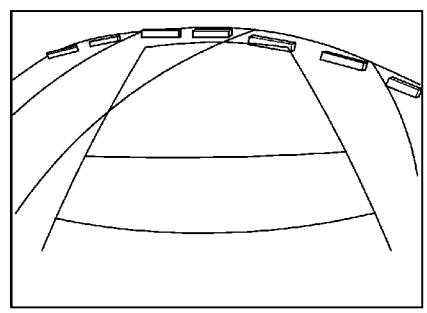
FIG. 2 illustrates an image in a state where a steering wheel is not manipulated according to an embodiment of the present invention.
Figure 3:
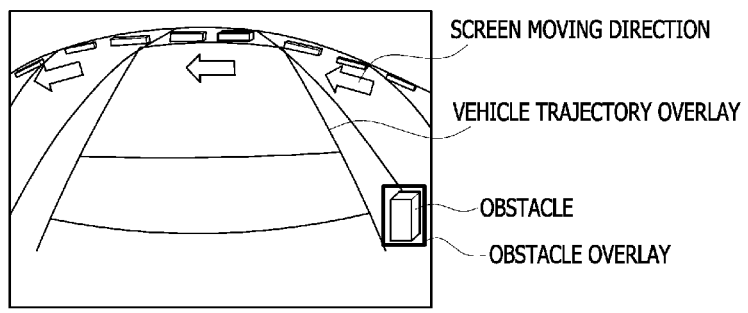
FIG. 3 illustrates an image in a state where a steering wheel is manipulated according to an embodiment of the present invention.

FIG. 1 is a block diagram of an apparatus of displaying a rear image of a vehicle according to an embodiment of the present invention, FIG. 2 illustrates an image in a state where a steering wheel is not manipulated according to an embodiment of the present invention, and FIG. 3 illustrates an image in a state where a steering wheel is manipulated according to an embodiment of the present invention.

Referring to FIG. 1, an apparatus for displaying a rear image of a vehicle according to an embodiment of the present invention includes a traveling direction detection unit 10, a rear camera 20, a steering angle sensor 30, an eyeball recognition sensor 40, a display angle adjustment unit 50, an obstacle detection unit 60, a collision prevention unit 70, a display unit 80 and an image processing unit 90.

The traveling direction detection unit 10 detects whether the vehicle travels in a forward direction or backward direction. The traveling direction detection unit 10 detects a traveling direction of the vehicle on the basis of a position of a shift lever of the vehicle, and determines that the vehicle is traveling in the backward direction, when the shift lever is in a reverse gear position (R stage).

The rear camera 20 captures a rear image of the vehicle when the vehicle travels in a backward direction. The rear camera 20 may be installed in a rear end or at a side mirror of the vehicle. The rear image captured by the rear camera 20 has an angle of view of, for example, 190 degrees, and is warped. And then a part of the rear image having the angle of view of 190 degrees is output through the display unit 80. Here, the angle of view of the rear image is not limited to 190 degrees, and may be variously adopted.

The steering angle sensor 30 senses a steering angle of the steering wheel.

The eyeball recognition sensor 40 captures an image of the face of the driver and analyzes the captured image to detect an eyeball position of the driver. Provided that the eyeball recognition sensor 40 is installed in the vehicle and accurately captures the eyeball of the driver, an installation position of the same is not particularly limited to. The eyeball recognition sensor 40 may be installed at various positions in consideration of characteristics and an angle of a lens, or the body or the sitting posture of the driver.

The display angle adjustment unit 50 allows the driver to manually adjust the display angle. To the end, the display angle adjustment 50 receives information intended to be set by the driver, and adjusts the display angle according to the received information.

In the present embodiment, an image in a direction where the vehicle is to move backward is displayed through the display unit 80, and the image in the direction where the vehicle is to move backward corresponds to a part of the rear image having the angle of view of 190 degrees captured by the above-described rear camera 20. In other words, the image in the direction where the vehicle is to move backward corresponds to the part of the image captured by the rear camera 20, and may be an image deviated by a prescribed angle to the left or right from the center of the angle of view of 190 degrees, and at this time, the angle to the left or right from the center of the angle of the view of 190 degrees is referred to as the display angle. The display angle adjustment unit 50 allows the display angle to be directly set.

In addition, the information intended to be set by the driver may be the display angle itself, or an offset value of a preset display angle corresponding to the steering angle. Here, the display angle may be set for each angle of the steering wheel.

When the information intended to be set by the driver is the display angle itself, the image displayed through the display unit 80 corresponds to a range of the display angle, which is set by the driver. When the information intended to be set by the driver is the offset value of the preset display angle corresponding to the steering angle, the image displayed through the display unit 80 is an image in a range that the offset value of the preset display angle is reflected to the steering angle.

When the vehicle is detected to be moving backward by the traveling direction detection unit 10, the image processing unit 90 converts the rear image captured by the rear camera 20 into an image in a direction where the vehicle is to move backward according to the steering angle of the steering wheel, which is sensed by the steering angle sensor 30, and displays the image in the direction where the vehicle is to move backward through the display unit 80.

In this case, the image processing unit 90 converts the rear image captured by the rear camera 20 into the image in the direction where the vehicle is to move backward by setting a lookup table according to the steering angle to warp an image of the preset display angle corresponding to the steering angle from the rear image captured by the rear camera 20.

The lookup table is information about which pixel of the rear image is used for forming a warped image, and is set for each steering angle of the steering wheel, when the warped image (the image in the direction where the vehicle is to move backward) is formed from the rear image captured by the rear camera 20. Here, to set the lookup table is to set, for each steering angle, information about making the lookup table, namely, which position of the rear image is used for forming the warped image. The image in the direction where the vehicle is to move backward is generated by processing warping using the set information.

Accordingly, when the steering angle of the steering wheel is sensed by the steering angle sensor 30, the image processing unit 90 generates the warped image, namely, the image in the direction where the vehicle is to move backward, using the lookup table suitable for the display angle according to the sensed steering angle.

In this case, the image processing unit 90 sets the lookup table according to the eyeball position of the driver, which is sensed by the eyeball recognition sensor (40), to correct the image in the direction where the vehicle is to move backward, or sets the lookup table according to the display angle adjusted by the display angle adjustment unit 50 to correct the image in the direction where the vehicle is to move backward.

In other words, the image processing unit 90 sets the lookup table according to the steering angle of the steering wheel, which is sensed by the steering sensor 30, the eyeball position of the driver, which is sensed by the eyeball recognition sensor 40, and the display angle adjusted by the display angle adjustment unit 50, and converts the rear image captured by the rear camera 20 into the image in the direction where the vehicle is to move backward according to the lookup table.

The obstacle detection unit 60 analyzes the image in the direction where the vehicle is to move backward, which is converted by the image processing unit 90, to detect an obstacle from the image. In this case, the obstacle detection unit 60 detects the obstacle through an algorithm that determines whether an object is the obstacle by learning an obstacle image.

The collision prevention unit 70 detects a possibility of collision of the vehicle with the obstacle detected by the obstacle detection unit 60, and prevents collision with the obstacle according to the detected collision possibility.

The collision prevention unit 70 includes a collision possibility detection unit 71, a determination unit 72, an alarm output unit 73, and a brake control unit 74.

When the obstacle is detected by the obstacle detection unit 60, the collision possibility detection unit 71 detects a distance between the obstacle and the vehicle, and detects the possibility of collision of the vehicle with the corresponding obstacle using at least one of a traveling trajectory, a traveling direction and a speed of the vehicle.

The determination unit 72 compares the collision possibility detected by the collision possibility detection unit 71 with a preset threshold value to determine whether the collision possibility is the threshold value or greater.

Here, the threshold value is a collision possibility that the vehicle is highly possible to collide with the obstacle. Accordingly, when the collision possibility is the threshold value or greater, the vehicle is determined to be highly possible to actually collide with the obstacle.

The alarm output unit 73 outputs an alarm when the collision possibility is the threshold value or greater according to a result of the determination by the determination unit 72. Accordingly, the driver may recognize the collision with the obstacle and perform a control on the vehicle, such as stopping the vehicle.

The brake control unit 74 controls the brake of the vehicle to stop the vehicle, when the collision possibility is the threshold value or greater according to the result of the determination by the determination unit 72. Accordingly, the collision with the obstacle according to a miss of the driver may be prevented in advance.

Here, the alarm output unit 73 and the brake control unit 74 may independently or simultaneously perform the operations according to the determination result of the determination unit 72.

The display unit 80 synthesizes an obstacle overlay of the obstacle detected by the obstacle detection unit 60 with the image in the direction where the vehicle is to move backward and displays the synthesized result, or synthesizes a vehicle trajectory overlay of the vehicle with the image in the direction where the vehicle is to move backward and displays the synthesized result.

Here, the obstacle overlay is an image to be overlapped on the screen so that the driver may perceive the obstacle, and the vehicle trajectory overlay is an image that represents vehicle trajectory information when the vehicle moves backward.

FIG. 2 shows an image displayed through the display unit 80 in a state where the steering wheel is not operated. Since the steering wheel is not operated, the image represents a rear image captured by the rear image 20, which is not an image in a direction that the vehicle is to proceed.

FIG. 3 shows an image displayed through the display unit 80 in a state where the steering wheel is operated. FIG. 3 shows an image in a direction that the vehicle is to proceed when the driver rotates the steering wheel left.

Referring to FIG. 3, as the steering wheel rotates left, it may be seen that the image in the direction where the vehicle is to move backward is an image that the rear image captured by the rear camera 20 is moved left (in an arrow direction).

In addition, the obstacle overlay displays the obstacle detected by the obstacle detection unit 60, and thus allows the driver to easily perceive the obstacle on the screen.

Hereinafter, a method for displaying a rear image of a vehicle according to the present invention will be described in detail with reference to FIG. 4.

Figure 4:
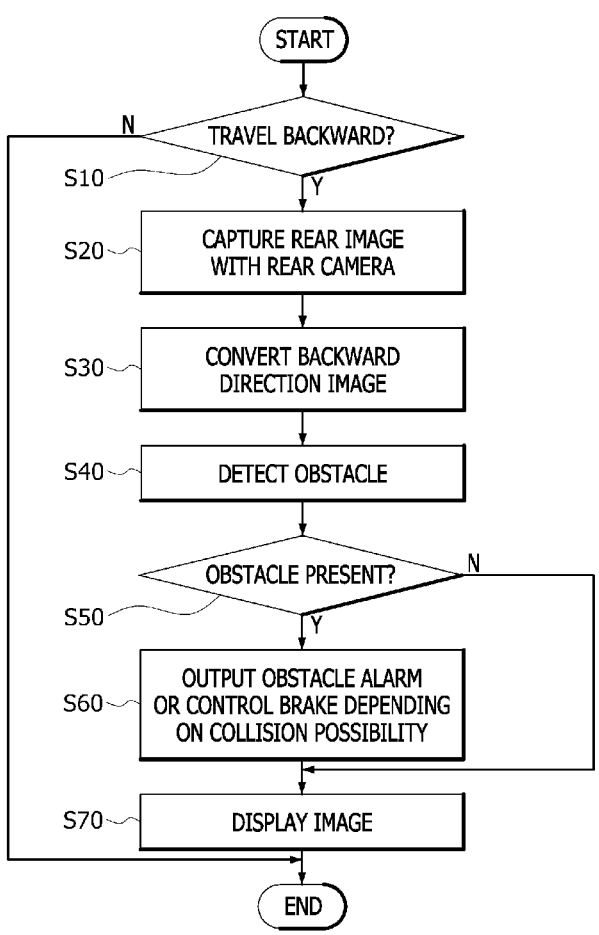
FIG. 4 is a flowchart of a method for displaying a rear image of a vehicle according to an embodiment of the present invention.

FIG. 4 is a flowchart of a method for displaying a rear image of a vehicle according to an embodiment of the present invention.

Referring to FIG. 4, the traveling direction detection unit 10 detects whether the vehicle travels in a forward direction of the vehicle, and at this point, detects whether the shift lever of the vehicle is in the rear gear position (R stage).

In this case, when the vehicle is detected to travel backward by the traveling direction detection unit 10 (at step S10), the rear camera 20 captures a rear image of the vehicle (at step S20).

As the rear image of the vehicle is captured by the rear camera 20, the image processing unit 90 sets the lookup table according to the steering angle of the steering wheel, which is sensed by the steering sensor 30, the eyeball position of the driver, which is sensed by the eyeball recognition sensor 40, and the display angle adjusted by the display angle adjustment unit 50, and converts the rear image captured by the rear camera 20 into the image in the direction where the vehicle is to move backward according to the lookup table (at step S30).

In other words, the image processing unit 90 converts the rear image captured by the rear camera 20 into the image in the direction where the vehicle is to move backward by setting the lookup table according to the steering angle of the steering wheel, which is detected by the steering angle sensor 30, and warping an image of a preset display angle, which corresponds to the steering angle, from the rear image captured by the rear camera 20.

In addition, the image processing unit 90 sets the lookup table according to the eyeball position of the driver, which is sensed by the eyeball recognition sensor (40), to correct the image in the direction where the vehicle is to move backward, or sets the lookup table according to the display angle adjusted by the display angle adjustment unit 50 to correct the image in the direction where the vehicle is to move backward.

As the rear image of the vehicle, which is captured by the rear camera 20, is converted by the image processing unit 90 into the image in the direction where the vehicle is to move backward, the obstacle detection unit 60 analyzes the image in the direction where the vehicle is to move backward to detect the obstacle in the corresponding image (at step S40).

When the obstacle is detected by the obstacle detection unit 60 (at step S50), the collision prevention unit 70 detects the collision possibility of the obstacle detected by the obstacle detection unit 60 with the vehicle, and outputs an alarm or controls the brake according to the detected collision possibility to prevent collision with the obstacle (at step S60).

In other words, when the collision possibility is the threshold value or greater, the collision prevention unit 70 outputs the alarm or control the brake of the vehicle so as to stop the vehicle, and thus prevents the collision with the obstacle by a miss of the driver when the vehicle moves backward.

Furthermore, the display unit 80 synthesizes the obstacle overlay of the obstacle detected by the obstacle detection unit 60 with the image in the direction where the vehicle is to move backward and displays the synthesized result, or synthesizes a vehicle trajectory overlay of the vehicle with the image in the direction where the vehicle is to move backward and displays the synthesized result (at step S70).

In this way, an apparatus and method for displaying a rear image of a vehicle according to an embodiment of the present invention may improve convenience of a driver by displaying the image in the direction where the vehicle is to move backward, when the vehicle moves backward.

In addition, an apparatus and method for displaying a rear image of a vehicle according to an embodiment of the present invention may prevent a collision with an obstacle when the vehicle moves backward by sensing the obstacle present in the direction where the vehicle is to move backward.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A system for displaying a rear view image of a vehicle comprising:
   a rear camera configured to capture a rear view of a vehicle;
   a steering angle sensor configured to sense a steering angle of a steering wheel of the vehicle;
   a display unit;
   a data storage storing a lookup table defining a respective correspondence between a plurality of steering angles and a plurality of preset display angles;
   a processor; and
   memory storing instructions that, when executed by the processor, cause the processor to control the system to perform:
      receiving, from a driver of the vehicle, a user input indicating an offset value for each of the plurality of preset display angles;
      modifying, based on the offset value, the plurality of preset display angles such that, in the lookup table, the plurality of steering angles respectively corresponds to a plurality of modified preset display angles;
      receiving, from the rear camera, an image capturing the rear view of the vehicle;
      receiving, from the steering angle sensor, a first steering angle of the steering wheel;
      detecting whether the vehicle is moving backward; and
      in response to determining that the vehicle is moving backward, performing:
         determining, based on the received first steering angle, a driving direction of the vehicle;
         generating, based on the received image and the determined driving direction of the vehicle, a rear view image showing the rear view directed in the determined driving direction of the vehicle; and
         causing the generated rear view image to be displayed via the display unit, wherein, for generating the rear view image, the instructions, when executed by the processor, further cause the processor to control the system to perform:
identifying, from the modified lookup table, a first preset display angle corresponding to the first steering angle, the first preset display angle being one of the modified preset display angles; and
warping, based on the first preset display angle, the received image such that the generated rear view image reflects the first preset display angle.

2. The system of claim 1 wherein:
the system further comprises an eyeball recognition sensor configured to detect an eyeball position of a driver of the vehicle, and
the instructions, when executed by the processor, further cause the processor to control the system to perform setting the lookup table based on the detected eyeball position.

3. The system of claim 1, wherein the instructions, when executed by the processor, further cause the processor to control the system to perform analyzing the received image to detect an obstacle.

4. The system of claim 3, wherein the instructions, when executed by the processor, further cause the processor to control the system to perform:
determining a possibility of a collision of the vehicle with the detected obstacle; and
controlling the vehicle to prevent the collision with the detected obstacle based on the detected collision possibility.

5. The system of claim 4, wherein, for controlling the vehicle to prevent the collision with the detected obstacle, the instructions, when executed by the processor, further cause the processor to control the system to perform:
determining whether the determined possibility of the collision meets a preset threshold value; and
in response to determining that the determined possibility of the collision meets the preset threshold value, causing an alarm to be output to a driver of the vehicle.

6. The system of claim 4, wherein, for preventing the collision with the detected obstacle, the instructions, when executed by the processor, further cause the processor to control the system to perform:
determining whether the determined possibility of the collision meets a preset threshold value; and
in response to determining that the determined possibility of the collision meets the preset threshold value, controlling a brake of the vehicle to stop the vehicle.

7. The system of claim 3, wherein the instructions, when executed by the processor, further cause the processor to control the system to perform:
synthesizing an overlay image representing the detected obstacle; and
causing the display unit to display the synthesized overlay image over the displayed rear view image.

8. The system of claim 1, wherein the instructions, when executed by the processor, further cause the processor to control the system to perform:
synthesizing an overlay image representing a trajectory of the vehicle; and
causing the display unit to display the synthesized overlay image over the displayed rear view image.

9. A method of operating a system for displaying a rear view image of a vehicle, comprising:
receiving, from a driver of the vehicle, a user input indicating an offset value for each of a plurality of preset display angles, wherein a respective correspondence between a plurality of steering angles and the plurality of preset display angles is defined in a lookup table stored in a data storage of the vehicle;
receiving, from a driver of the vehicle, a user input indicating an offset value for each of the plurality of preset display angles;
modifying, based on the offset value, the plurality of preset display angles such that, in the lookup table, the plurality of steering angles respectively corresponds to a plurality of modified preset display angles;
generating an image capturing a rear view of a vehicle;
sensing a first steering angle of a steering wheel of the vehicle;
detecting whether the vehicle is moving backward; and
in response to determining that the vehicle is moving backward, performing:
determining, based on the first steering angle, a driving direction of the vehicle;
generating, based on the received image and the determined driving direction of the vehicle, a rear view image showing the rear view directed in the determined driving direction of the vehicle; and
causing the generated rear view image to be displayed via a display of the vehicle,
wherein, for generating the rear view image, the instructions, when executed by the processor, further cause the processor to control the system to perform:
identifying, from the modified lookup table, a first preset display angle corresponding to the first steering angle of the vehicle, the first preset display angle being one of the modified preset display angles; and
warping, based on the first preset display angle, the received image such that the generated rear view image reflects the first preset display angle.

10. The method of claim 9, further comprising:
detecting an eyeball position of a driver of the vehicle; and
setting the lookup table based on the detected eyeball position.

11. The method of claim 9, further comprising analyzing the received image to detect an obstacle.

12. The method of claim 11, further comprising:
determining a possibility of a collision of the vehicle with the detected obstacle; and
controlling the vehicle to prevent the collision with the detected obstacle based on the detected collision possibility.

13. The method of claim 12, wherein controlling the vehicle comprises:
determining whether the determined possibility of the collision meets a preset threshold value; and
in response to determining that the determined possibility of the collision meets the preset threshold value, causing an alarm to be output to a driver of the vehicle.

14. The method of claim 12, wherein controlling the vehicle comprises:
determining whether the determined possibility of the collision meets a preset threshold value; and
in response to determining that the determined possibility of the collision meets the preset threshold value, controlling a brake of the vehicle to stop the vehicle.

15. The method of claim 9, further comprising:
synthesizing an overlay image representing the detected obstacle; and
displaying the synthesized overlay image over the displayed rear view image.

16. The method of claim 9, further comprising:
synthesizing an overlay image representing a trajectory of the vehicle; and
displaying the synthesized overlay image over the displayed rear view image.

\* \* \* \* \*